April 8, 1924.
H. D. CHURCH
AXLE AND WHEEL CONSTRUCTION FOR MOTOR VEHICLES
Filed March 20, 1919
1,489,384
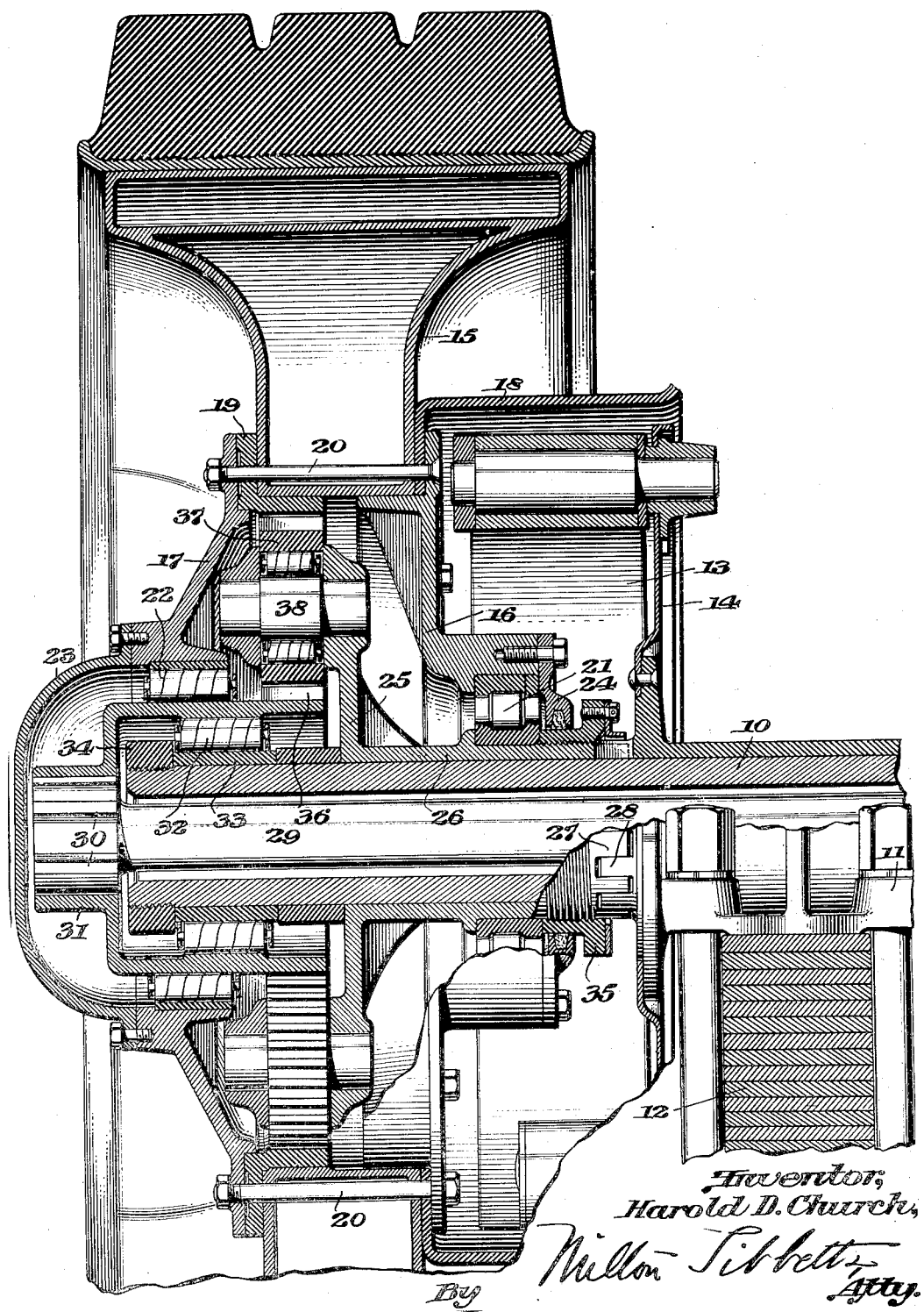

Patented Apr. 8, 1924.

1,489,384

UNITED STATES PATENT OFFICE.

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

AXLE AND WHEEL CONSTRUCTION FOR MOTOR VEHICLES.

Application filed March 20, 1919. Serial No. 283,788.

*To all whom it may concern:*

Be it known that I, HAROLD D. CHURCH, a citizen of the United States, and resident of Detroit, Wayne County, State of Michigan, have invented certain new and useful Improvements in Axle and Wheel Construction for Motor Vehicles, of which the following is a specification.

This invention relates to motor vehicles and particularly to axle and wheel construction.

One object of the invention is to provide a wheel and axle construction embodying spur reduction gearing in the wheel hub with provision for removing the driving axle section without disturbing the gearing or the wheel bearings, and with other novel features.

Another object of the invention is to provide a simple and strong wheel and axle construction in which the gear reduction is arranged in the wheel hub.

Other objects of the invention will appear from the following description taken in connection with the drawing which forms a part of this specification, and in which the figure is a vertical sectional view through a wheel and axle embodying the invention.

Referring to the drawing, 10 represents a stationary axle or supporting member shown in the form of a tube. A spring pad 11 is mounted on the axle tube and a spring 12 is supported on the spring pad. Brake shoes 13 are shown as supported by the spring pad on a bracket 14.

A wheel 15 which is of the cast steel type is provided with inner and outer hub members 16 and 17 respectively. These hub members, together with a brake drum 18 and an internal gear 19, are secured together and to the wheel 15 by a series of bolts 20.

The hub members 16 and 17 contain the main bearings 21 and 22 of the wheel 15 and these hub members together with an outer cap 23 form a housing for the bearings and the reduction gearing arranged in the hub. A packing plate 24 is secured to the inner end of the hub member 16 to prevent the entrance of foreign matter to the housing.

Within the hub is a torque reaction member 25 having a sleeve 26 adapted to be passed over the end of the axle member 10. The inner end of the sleeve 26 is formed with a series of jaws 27 which co-operate with similar jaws 28 integrally or otherwise suitably formed on the spring pad 11 so that the torque reaction of the reduction gearing will be transferred through the member 25 directly to the spring pad 11. The spring 12 is preferably so connected at one of its ends to the vehicle frame that the torque and drive of the rear axle is by said spring transmitted to the body of the vehicle instead of using a separate torque rod as is sometimes the case. Within the axle 10 is a driving shaft or live axle section 29 which is suitably supported at its inner end (in the differential gearing not shown) and its outer end is provided with splines 30 co-operating with suitable keyways in a pinion member 31. The pinion member 31 extends inwardly over the outer end of the axle member 10 and has a bearing 32 on the axle member. The inner race 33 of this bearing is retained on the axle member as is also the member 25, by a nut 34 threaded on the end of the axle member. A nut or threaded ring 35 retains the inner race of the bearing 21 on the sleeve 26 so that said bearing 21 may take the side thrusts of the wheel 15 in both directions.

The pinion member 31 has a spur pinion 36 formed thereon in the plane of the internal gear 19 above referred to and the exterior of the pinion member 31, outwardly of the pinion 36, has a cylindrical surface which forms the inner race for the bearing 22 of the wheel 15.

An intermediate gear 37 is suitably mounted on a stud 38 in the member 25 and is in mesh with both the pinion 36 and the internal gear 19 so that it forms an idler between those gears and transmits the rotary motion of the gear 36 to the gear 19 and the wheel 15 at a reduced ratio.

By the above construction it will be seen that the axle section 29 may be removed from the axle tube by taking off the cap 23 and withdrawing the axle section, the splined connection to the pinion member 31 permitting this withdrawal. The inner end of the axle section 29 is of course also splined but it is smaller than the interior of the tube 10 and may therefore be withdrawn outwardly through it.

The wheel and axle may be further disassembled by taking off the outer hub member 17 which will permit the pinion member 31 to be withdrawn. The nut 34 may then be removed, and the remaining parts of the wheel and the torque reaction member 25 may be pulled off of the axle.

Other forms may be made without departing from the spirit of scope of the invention.

Having thus described my invention, what I claim and desire to secure by Letters Patent is:—

1. In an axle, the combination of an axle member of tubular form, a driving shaft extending through the axle member, a pinion member splined to the end of the axle shaft and having a bearing on said axle member, and said shaft and pinion being so constructed and arranged with respect to each other as to permit withdrawal of the driving shaft through the pinion member without removing the latter from the axle member.

2. In an axle, the combination with a tubular axle member, and a driving shaft extending through and beyond the end of the axle member, of a pinion member surrounding the outer end of the axle member and having a bearing thereon, said pinion member having a central opening therethrough large enough to permit outward withdrawal of the driving shaft through the pinion member, and a splined connection between the end of said shaft and said pinion member.

3. In an axle and wheel construction, a tubular axle member, a driving shaft mounted therein, inner and outer hub members rotatably mounted on said axle member, a road wheel, an annular gear, common means for securing said hub members and gear to said wheel, and driving connections between said gear and said driving shaft.

4. In an axle and wheel construction, a tubular axle member, a driving shaft mounted therein, anti-friction bearings carried by said tubular member, inner and outer hub members mounted on said bearings, a road wheel, an annular gear, common means for securing said hub members and gear to said wheel, and driving connections between said gear and said driving shaft.

In testimony whereof I affix my signature.

HAROLD D CHURCH.